3,536,771
METHOD FOR PRODUCING CYCLOHEXANE VIA THE HYDROGENATION OF BENZENE
Richard R. De Graff, Arlington Heights, Ill., assignor to Universal Oil Products Company, Des Plaines, Ill., a corporation of Delaware
Filed Feb. 7, 1969, Ser. No. 797,548
Int. Cl. C07c 5/10
U.S. Cl. 260—667       7 Claims

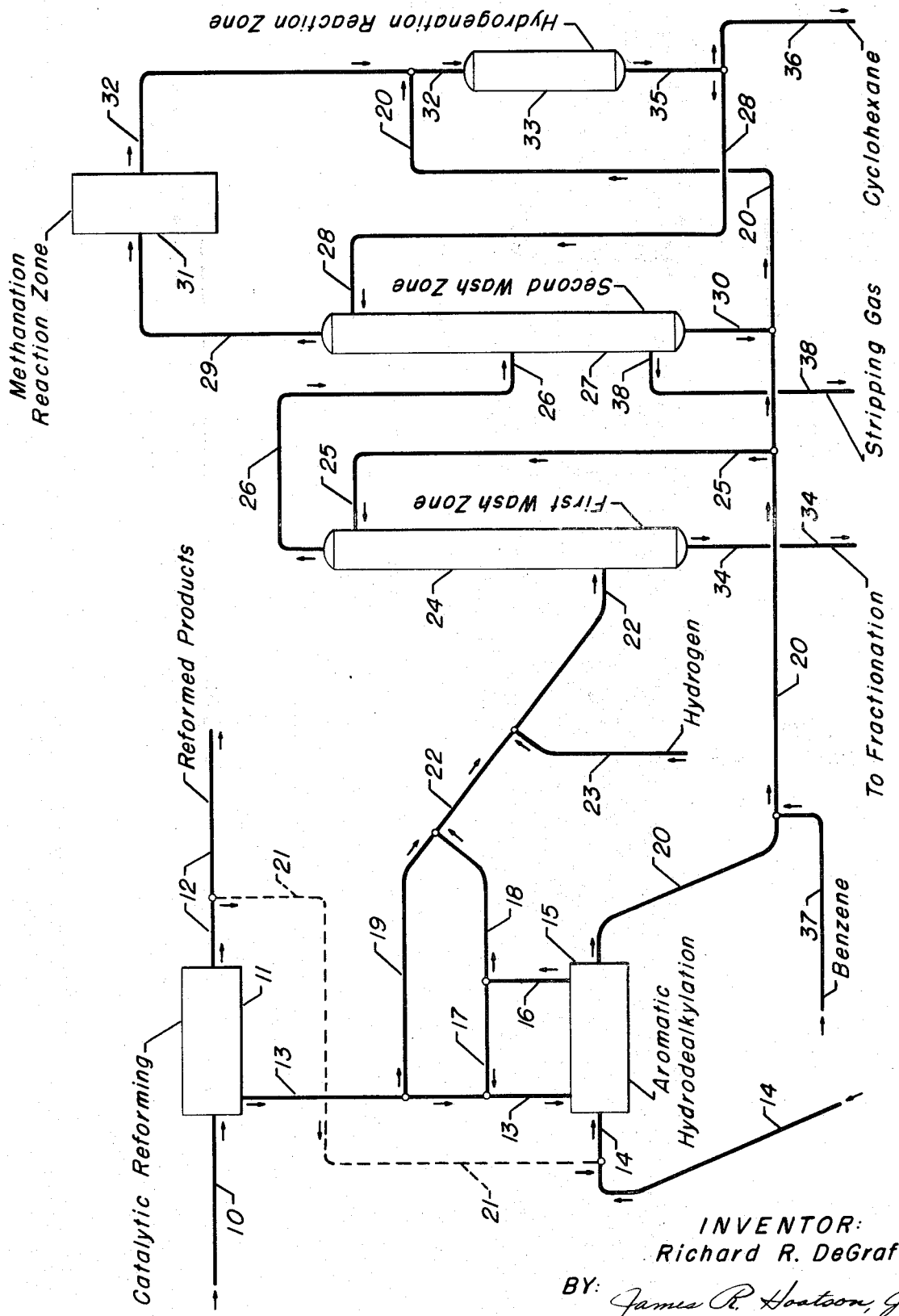

ABSTRACT OF THE DISCLOSURE

Method for producing cyclohexane via catalytic dehydrogenation of benzene wherein the hydrogen feed gas is purified by a conditioning technique. The first stage uses benzene as the wash liquid and the second stage uses cyclohexane as the wash liquid.

BACKGROUND OF THE INVENTION

This invention relates to a method for hydrocarbon conversion. It also relates to a method for producing cyclohexane via the catalytic hydrogenation of benzene. It specifically relates to a method for conditioning hydrogen for use in the benzene hydrogenation reaction.

It has long been known that cyclohexane could be prepared by the catalytic hydrogenation of benzene. Cyclohexane is desirable in industry for use in the production of nylon and other industrial products, such as cyclohexanol, cyclohexanone, phenol, adipic acid, caprolactam, etc. By far, the largest amount of cyclohexane is utilized in the manufacture of nylon with adipic acid being utilized to manufacture nylon 6 and caprolactam being utilized to manufacture nylon 66. Adipic acid is also a starting material for the manufacture of various plasticizers and lubricants. In addition, cyclohexane is useful as a solvent for cellulose ethers, fats and oils, rubber, essential oils, etc. and can be effectively used as a paint remover.

Generally, cyclohexane is produced by contacting benzene and hydrogen in a reaction zone under conditions sufficient to convert the benzene to cyclohexae with a minimum of side reactions. The source of the hydrogen used in this reaction is typically obtained from a petroleum hydrocarbon catalytic reforming operation for the production of gasoline boiling range products, such as benzene, toluene, and xylene. In similar fashion, benzene feedstock is obtained in sufficient high purity from the catalytic reforming operation by means well known to those skilled in the art. Additinal benzene feedstock may also be obtained from the hydrodealkylation of toluene which is also one of the end products separated from the effluent of a catalytic reforming operation.

It is also known that the usual hydrogen source for such hydrogenation reactions, which is the vent gas from the catalytic reformer, is frequently contaminated with hydrocarbons which boil at or substantially at the boiling point of cyclohexane or higher, sulfur compounds, oxygen compounds, and hexane and heavier hydrocarbons. These contaminants, as those skilled in the art are aware, inhibit the effectiveness of recovering high purity cyclohexane from the catalytic hydrogenation zone. In addition, toluene as a contaminant, also causes increased hydrogen consumption within the benzene hydrogenation reaction zone. Accordingly, the prior art schemes have utilized various and sundry techniques for removing these contaminating quantities of materials from the hydrogen feed stream. Frequently, the contaminants are removed by the prior art utilizing distillation techniques, caustic washing techniques, absorption, further conversion, etc. It is of significant commercial importance that the cyclohexane have as high a purity as feasible or otherwise the end product, such as, for example, nylon, will be of less quality than desired by those skilled in the art.

SUMMARY OF THE INVENTION

Therefore, it is an object of this invention to provide a method for hydrocarbon conversion.

It is also an object of this invention to provide a method for producing cyclohexane via catalytic hydrogenation of benzene.

It is a particular object of this invention to provide an improved method for producing cyclohexane from the catalytic hydrogenation of benzene in a manner which conditions and purifies the hydrogen reactant in a facile and economical manner.

It is a specific object of this invention to provide a combination process utilizing catalytic reforming, alkyl aromatic hydrodealkylation, methanation, benzene hydrogenation, and a two-stage conditioning technique on the hydrogen stream, all of which cooperatively operate in a facile and economical manner.

These objects and other advantages of the invention will become more clearly understood from the description presented hereinbelow with reference to the appended drawing which is a schematic diagram of apparatus for practicing one embodiment of the invention.

Therefore, in accordance with the practice of this invention, there is provided a method for producing cyclohexane via hydrogenation of benzene which comprises the steps of: (a) introducing an impure hydrogen stream containing carbon oxides and hydrocarbon components as contaminants therein into a first conditioning zone in contact with a liquid selective for displacing said hydrocarbon contaminant from the hydrogen stream and which has a lower boiling point than said contaminants; (b) withdrawing from said first zone a hydrogen stream having reduced hydrocarbon contaminant content, and containing said carbon oxides and a minor amount of said liquid; (c) passing said hydrogen stream of Step (b) into a second conditioning zone in contact with a fluid comprising cyclohexane under conditions sufficient to remove said liquid from said hydrogen stream, thereby producing a gaseous fraction comprising hydrogen contaminated with carbon oxides; (d) introducing said gaseous fraction into a catalytic methanation zone under conditions sufficient to convert said carbon oxides to methane and water, thereby producing a purified gaseous stream consisting of hydrogen having substantial freedom from hydrocarbon contaminants of six (6) or more carbon atoms per molecule; (e) passing said hydrogen stream of Step (d) and a benzene feed stream into a reaction zone maintained under conditions sufficient to convert benzene to cyclohexane; and, (f) recovering cyclohexane in high concentration and high purity from the effluent of said reaction zone.

A more specific embodiment of this invention includes the method hereinabove wherein said liquid comprises benzene and said fluid of Step (c) comprises a portion of the cyclohexane separated from the effluent of the reaction zone.

In essence, therefore, the present invention provides a method for producing cyclohexane via catalytic hydrogenation of benzene wherein the hydrogen feed gas is purified by a two-stage conditioning technique. It was found that this two-stage technique provided for substantial improvements in the overall method due to an increased efficiency of the methanation reaction which is also influenced by the hydrocarbon contaminant content of the hydrogen feed gas to the methanation reaction zone.

DETAILED DESCRIPTION OF THE INVENTION

The operating conditions for carrying out the catalytic hydrogenation of benzene to cyclohexane are well known to those skilled in the art. Generally, these conditions include a mol ratio of hydrogen-to-benzene in the feed to the reactor from 1:1 to 10:1, a net hourly space velocity from 0.5 to 2, and a reactor inlet temperature from 100° F. to 400° F. with the reactor outlet temperature being controlled preferably to less than 500° F. by the removal of the exothermic heat of reaction, generally through steam generation. Preferably, the inlet temperature to the reactor is maintained at about 290° F. The pressure in the reaction zone is also maintained relatively low; that is, a pressure of less than 750 p.s.i.g. is desirable, with pressures in the neighborhood of 350–450 p.s.i.g. being satisfactory. The benzene hydrogenation reaction is preferably catalytic utilizing conventional platinum type catalyst. Combinations of platinum and nickel are also satisfactory with these noble metals being combined in any suitable manner in the form of pellets or granules and deposited on suitable supports, such as alumina, silica, zirconia, and the like.

The feedstock for the hydrogenation reaction should be relatively pure benzene and desirably is obtained from the well known catalytic reforming operation. Alternatively, according to one embodiment of the invention, the benzene feedstock is obtained by the hydrodealkylation of toluene which may also be obtained from the catalytic reforming process. Similarly, the hydrogen utilized in the hydrogenation reaction should be relatively pure. However, in most petroleum refineries there is an abundant source of impure hydrogen obtained frequently as the net vent gas from the catalytic reformer or a net gaseous product from the hydrodealkylation process which can be utilized after treatment according to the concepts of this invention in the hydrogenation reaction. It is to be understood, however, that for purposes of this invention, the broad embodiment may obtain an impure hydrogen stream from any source whatsoever and a benzene stream from any source whatsoever. It is only the specific embodiment of this invention that provides the combination process involving catalytic reforming, aromatic hydrodealkylation, hydrogen washing, methanation, and hydrogenation to produce cyclohexane in a facile and economical manner. For the specific embodiment involving hydrodealkylation, it is recognized that this conversion process is well known to those skilled in the art.

Suitable charge stocks to the dealkylation reaction may include alkyl aromatic hydrocarbons, such as toluene, metaxylene, orthoxylene, paraxylene, ethylbenzene, orthodiethylbenzene, metadiethylbenzene, paradiethylbenzene, etc. Preferably, the charge stock is relatively pure toluene, since the higher molecular weight alkyl aromatic hydrocarbons tend to undergo undesirable side reactions during the hydrodealkylation process. The hydrodealkylation reaction may be carried out in the presence or absence of a catalyst. If a catalyst is utilized, those containing a noble metal of Group VIII of the Periodic Table, including platinum, palladium, rhodium, etc. composited with a suitable inorganic oxide have been found satisfactory. The hydrodealkylation catalysts are well known to those skilled in the art and need not be described in detail herein.

The hydrodealkylation reaction is performed in the presence of hydrogen at temperatures ranging from about 1000° F. to about 1500° F., and preferably from within the range from 1100° F. to about 1300° F. The pressure maintained in the dealkylation reaction zone is usually from within the range of 300 to 1000 p.s.i.g. and more preferably from within the range from 500 to 700 p.s.i.g. Satisfactory space velocities include a liquid hourly space velocity from about 0.5 to about 10.0. In the absence of a catalyst, the operating conditions are maintained generally within the ranges mentioned hereinabove except that a residence time of from 5 seconds to 30 minutes may be utilized to effectuate the hydrodealkylation reaction. As those skilled in the art are aware, benzene in high concentration and high purity may be obtained from the effluent of the hydrodealkylation reaction zone.

In most cases, the hydrodealkylation reaction zone is continuous in that there is a continually circulating hydrogen stream being introduced and withdrawn from the reaction zone. Make-up hydrogen is generally obtained from the catalytic reforming operation and in order to maintain hydrogen purity at a sufficiently high level, a net amount of hydrogen is vented from the hydrodealkylation reaction zone. This net amount of hydrogen is one source of hydrogen that is utilized as hydrogen feed within the concepts of the present invention.

As previously mentioned, toluene is the preferred feedstock to the aromatic hydrodealkylation reaction zone. Such toluene may be conveniently obtained from the well known catalytic reforming operation which utilizes a platinum catalyst to convert a naphtha boiling range material into highly aromatic components, such as a mixture of benzene, toluene, and xylene. The toluene is frequently obtained from the catalytic reforming operation as a separate product utilizing the well known solvent extraction technique, such as sulfolane extraction or glycol extraction. It is also known that the catalytic reforming operation is a net producer of hydrogen and it is this net hydrogen product which is also a useful source of hydrogen within the concepts of this invention. A more detailed analysis of catalytic reforming need not be presented herein since it is a well known process.

At this point in the description of the present invention it is immediately evident that the process of this invention of necessity operates on relatively impure hydrogen which is contaminated at least with a noncyclic hydrocarbon contaminant having more than six (6) carbon atoms per molecule and is also contaminated with oxygen compounds, such as the carbon oxides. These contaminants are detrimental to the subsequent benzene hydrogenation reaction in that hydrogenation catalyst activity is adversely affected by the presence of carbon oxides and product quality is adversely affected by the hydrocarbon contaminants. Accordingly, a methanation reaction zone is used in this invention to remove the carbon oxides from the impure hydrogen stream by converting such oxides to methane and water. Furthermore, the impure hydrogen stream is also contnaminated with relatively heavy hydrocarbons, such as the $C_6+$ hydrocarbons, e.g. toluene, which if not removed would, for example, form azeotropes with the cyclohexane product and hexane would not be separable from the cyclohexane by conventional distillation.

Therefore, the present invention provides for the removal of these relatively heavy hydrocarbons by the utilization of a first conditioning zone wherein the impure hydrogen stream is contacted with a liquid, such as a portion of the benzene feed stream, in order to replace these hydrocarbon contaminants in the hydrogen stream with the liquid. However, it was found that while this first zone was satisfactory for the removal of the heavy hydrocarbons from the hydrogen stream, such first zone operation created an additional problem within the hydrogen circuit. This problem, in essence, is the carry over or entrainment of the liquid, e.g. benzene, into the hydrogen stream. It was discovered that the benzene contaminant was a significant detriment to the subsequent methanation reaction which has been previously mentioned. Therefore, according to this invention, the hydrogen gas from the first conditioning zone is now contacted in a second conditioning zone with a different fluid under conditions which effectively reduce the benzene content of the hydrogen gas to a level not detrimental to the methanation reaction; for example, to less than 0.5 mol percent benzene in the exit gas from the second zone. It was also discovered that an eminently suitable fluid for the second zone was a portion of the cyclohexane which was separated from the effluent of the benzene hydrogenation reaction zone.

In short, it is the purpose of the first hydrogen gas conditioning zone, using for example benzene, to replace the hydrocarbon contaminants having the same or higher boiling point as cyclohexane with the benzene. Therefore, the displacing liquid should be lower boiling than the contaminannts to be displaced, since the displacement is really a mass transfer operation. On the other hand, it is the purpose of the second hydrogen gas conditioning zone, using for example cyclohexane, to reduce the benzene content of the gas feed to the methanator to a level which permits operation of the methanator at an inlet temperature, for example, of no less than 375° F. and an outlet temperature no higher than 475° F.

As previously mentioned, the impure hydrogen streams from the sources described contained traces of oxygen compounds such as carbon monoxide. These oxides of carbon and particularly carbon monoxide as well as any other oxides in the hydrogen gas stream are detrimental to the catalyst in the benzene hydrogenation zone. Therefore, the methanation reaction is utilized to convert these carbon oxides into methane and water. Generally, the methanation reaction is operated at a pressure from 400 to 500 p.s.i.g. and at a temperature of about 400° F. A suitable catalyst for the methanation reaction typically comprises nickel on kieselguhr. However, the methanation reaction system is well known to those skilled in the art and need not be described herein in greater detail. Suffice it to say that it is an essential part of this invention that the two-stage conditioning technique be operated in a manner to reduce the benzene contaminant to the methanation reaction zone to a level, for example, of less than 0.5 mol percent or sufficient to permit the operation of the methanator within the above mentioned temperature limits. Otherwise, the methanation reaction zone becomes exceedingly difficult to control, and if excessive amounts of benzene are in the feed to the methanation reaction zone, a run-away reaction and/or catalyst deactivation may result.

DESCRIPTION OF THE DRAWING

Referring now to the drawing, a naphtha boiling range feed material enters the combination process, more fully described hereinafter, via line 10 and is introduced into catalytic reforming zone 11 which is a conventional platinum catalyst reformer for the production of benzene, toluene, and xylene. The reformed products are withdrawn from catalytic reforming zone 11 via line 12 and passed into product recovery facilities, not shown, for the separation therein of the desirable individual product streams of benzene, xylene, and toluene. Since the catalytic reforming reaction is a net producer of hydrogen, reformed vent gas is withdrawn from zone 11 via line 13 and introduced into alkyl aromatic hydrodealkylation reaction zone 15 which is maintained under the general conditions specified hereinabove. The feedstock to dealkylation zone 15 is introduced from an extraneous source via line 14 and/or from line 21 which depicts the return of toluene, for example, from the product recovery facilities of the reforming operation previously mentioned.

Hydrogen gas from dealkylation zone 15 is withdrawn via line 16 and returned to the reaction zone via lines 17 and 13. A net source of vent hydrogen from the dealkylation zone is withdrawn via line 18, admixed with additional hydrogen from the catalytic reformer from line 19, and the admixture introduced into first wash zone 24. Alternatively, or in conjunction therewith, impure hydrogen from an extraneous source may be introduced into the system via line 23.

The resulting product from the dealkylation reaction comprises benzene in high concentration and high purity. This product stream is withdrawn via line 20 and is utilized as a feed source to the subsequent hydrogenation reaction zone, more fully discussed hereinbelow. In addition to the benzene produced in the dealkylation reaction zone there may be introduced into the system an additional amount of benzene from an extraneous source via line 37. As previously mentioned, it is to be recognized that the material in line 37 may be the sole source of benzene to the hydrogenation reaction zone and the material in line 23 may be the sole source of impure hydrogen for the process of the present invention. The preferred embodiment of this invention, however, utilizes the combination of catalytic reforming—catalytic hydrodealkylation to produce the hydrocarbon feedstocks suitable for use in the practice of this invention.

In the first conditioning zone 24 the impure hydrogen gas stream is contacted in countercurrent fashion by a portion of the incoming benzene feed stream via lines 20 and 25. Suitable conditions are maintained in first zone 24 to effectively remove contaminating quantities of relatively heavy hydrocarbons such as toluene from the impure hydrogen stream by replacing the toluene with benzene. It is the purpose of this first conditioning zone to substantially displace those hydrocarbons having more than six (6) carbon atoms per molecule from the hydrogen gas stream with benzene which is acceptable, of course, in the hydrogenation zone discussed hereinafter. However, in doing so, the lean gas withdrawn from first zone 24 via line 26 now contains significant quantities of the liquid displacing agent, e.g. benzene, which would be detrimental to the subsequent methanation reaction zone, as previously mentioned.

Accordingly, the lean gas in line 26 is introduced into second conditioning zone 27 which is operated to intimately contact the lean gas with a suitable fluid from line 28, which for illustrative purposes comprises cyclohexane from a source hereinafter described. The operating conditions in the second wash zone include, for example, a minimum mol ratio of cyclohexane-to-benzene of 1:1, sufficient to render the lean gas more amenable to methanation, e.g. to leave a maximum of 0.5 mol percent benzene in the exit gas, e.g. line 29. It is, of course, desirable that the benzene content of the exit gas be as low as possible, but for purposes of illustration, the feed gas to the methanation reaction zone may have a benzene content in line 29 not exceeding 0.5 mol percent benzene and, preferably, be about 0.1 mol percent to 0.2 mol percent benzene.

The rich liquid from the first conditioning zone 24 is withdrawn via line 34 and introduced into fractionation facilities, not shown, to separate the benzene and toluene. The rich fluid from the second conditioning zone is withdrawn via line 30 and preferably admixed with the incoming benzene feed and introduced into hydrogenation reaction zone 33 in a manner more fully discussed hereinafter. Since the rich liquid in line 30 may contain small amounts of carbon monoxide, a stripping gas is preferably introduced into column 27 via line 37 in order to reduce the CO content of the rich liquid to as low a level as possible, e.g. about 3 p.p.m. CO, or to a level such that the feed to the hydrogenation reaction zone 33 is only about 1 p.p.m. CO. The stripping gas may be any inert gas but, preferably, is hydrogen. A convenient source of hydrogen would be a portion of the recycle hydrogen gas from the hydrogenation reaction zone, not shown.

The exit gas in line 29 now has substantial freedom of hydrocarbons having six (6) or more carbon atoms per molecule. The essential contaminants of the hydrogen gas in line 29 comprise the carbon oxide plus minor amounts of methane and ethane. This exit gas is now introduced into methanation reaction zone 31 which is maintained under the conditions previously mentioned sufficient to convert carbon oxides to methane and water. The effluent from the methanation reaction zone 31 is withdrawn via line 32 and comprises now a purified hydrogen stream which is suitable for use in the hydrogenation of benzene.

The material in line 32 is introduced into hydrogenation reaction zone 33 in admixture with the benzene feed stream in line 20. Operating conditions maintained in hydrogenation reaction zone 33 include a temperature from about 300° F. to about 450° F. and a pressure from about 200 p.s.i.g. to about 600 p.s.i.g. across a suitable hydrogenation catalyst. Those skilled in the art are referred to U.S. Pat. No. 2,755,317 to Kassel for additional information on the hydrogenation of benzene. Typically, reaction zone 33 comprises a plurality of individual reactors containing a proper amount of hydrogenation catalyst. Preferably, the number of reaction zones will be three (3).

An effluent stream containing cyclohexane and light hydrocarbons, if any, is removed from reactor 33 via line 35 and passed into a suitable separation zone not shown for the separation of the light hydrocarbons from the normally liquid product. A net effluent stream containing cyclohexane is withdrawn from the system via line 36 and introduced into product recovery facilities, not shown, for the recovery of cyclohexane in high purity and high concentration. A portion of the cyclohexane separated from the effluent of reaction zone 33 is introduced via line 28 as the fluid in the second conditioning zone. It is essential to note, however, that the cyclohexane utilized as the fluid in the second wash zone may be obtained from any source whatsoever and the present invention is not necessarily to be limited by the configuration of apparatus indicated in the appended drawing.

As used herein, the term "impure hydrogen" or words of similar import is intended to embody the concept of a hydrogen stream containing undesirable other components, commonly called "contaminants." However, according to this invention, the displacement of these undesirable components with more desirable components, by the method herein called "conditioning," does not necessarily mean that the mol percent hydrogen in the gaseous stream has been either increased or decreased. For convenience, the term "conditioned hydrogen" is used interchangeably with "purified hydrogen" or words of similar import.

PREFERRED EMBODIMENT

The preferred embodiment of this invention provides a combination process for producing cyclohexane which comprises: (a) reforming a hydrocarbon stream to produce a first hydrogen fraction, and a hydrocarbon fraction containing reformed products; (b) subjecting a mixture of hydrogen and toluene to dealkylation conditions sufficient to produce a second hydrogen fraction, and a liquid stream comprising benzene; (c) passing said first and second hydrogen fractions into a first conditioning zone in contact with an aromatic hydrocarbon liquid; (d) removing from said first zone a combined gaseous stream comprising hydrogen contaminated with said aromatic hydrocarbon liquid; (e) passing said combined gaseous stream into a second conditioning zone in contact with cyclohexane under conditions sufficient to remove said liquid contaminant from the combined gaseous stream; (f) withdrawing from said second zone a hydrogen gas fraction contaminated with carbon oxides, and a rich liquid comprising cyclohexane and said aromatic hydrocarbon contaminant; (g) subjecting said hydrogen gas fraction of Step (f) to methanation under conditions sufficient to convert said carbon oxides to methane and water thereby producing a purified hydrogen stream containing less than 5 p.p.m. carbon monoxide; (h) introducing said purified hydrogen stream and a benzene feed stream into a conversion zone under conditions sufficient to convert benzene to cyclohexane; and, (i) recovering cyclohexane from the effluent of said conversion zone.

The invention claimed is:

1. Method for producing cyclohexane via hydrogenation of benzene which comprises the steps of:
    (a) inrtoducing an impure hydrogen stream containing carbon oxides and hydrocarbon components as contaminants therein into a first conditioning zone in contact with a liquid selective for displacing said hydrocarbon contaminant from the hydrogen stream and which has a lower boiling point than said contaminant;
    (b) withdrawing from said first zone a hydrogen stream having reduced hydrocarbon contaminant content, and containing said carbon oxides and a minor amount of said liquid;
    (c) passing said hydrogen stream of Step (b) into a second conditioning zone in contact with a fluid comprising cyclohexane under conditions sufficient to remove said liquid from said hydrogen stream, thereby producing a gaseous fraction comprising hydrogen contaminated with carbon oxides;
    (d) introducing said gaseous fraction into a catalytic methanation zone under conditions sufficient to convert said carbon oxides to methane and water, thereby producing a purified gaseous stream consisting of hydrogen having substantial freedom from hydrocarbon contaminants of six (6) or more carbon atoms per molecule;
    (e) passing said hydrogen stream of Step (d) and a benzene feed steam into a reaction zone maintained under conditions sufficient to convert benzene into cyclohexane; and,
    (f) recovering cyclohexane in high concentration and high purity from the effluent of said reaction zone.

2. Method according to claim 1 wherein said liquid comprises benezene and said fluid of Step (c) comprises a portion of the cyclohexane separated from the effluent of said reaction zone.

3. Method according to claim 2 wherein said conditions in the second conditioning zone includes a minimum of one mol of cyclohexane per mol of benzene in said hydrogen stream of Step (b) sufficient to produce said gaseous fraction containing less than 0.5 mol percent benzene.

4. Combination process for producing cyclohexane which comprises:
    (a) reforming a hydrocarbon stream to produce a first hydrogen fraction, and a hydrocarbon fraction containing reformed products;
    (b) subjecting a mixture of hydrogen and toluene to dealkylation conditions sufficient to produce a second hydrogen fraction, and a liquid stream comprising benzene;
    (c) passing said first and second hydrogen fractions into a first conditioning zone in contact with an aromatic hydrocarbon liquid;
    (d) removing from said first wash zone a combined gaseous stream comprising hydrogen contaminated with said aromatic hydrocarbon liquid;
    (e) passing said combined gaseous stream into a second conditioning zone in contact with cyclohexane under conditions sufficient to remove said liquid contaminant from the combined gaseous stream;
    (f) withdrawing from said second zone a hydrogen gas fraction contaminated with carbon oxides, and a rich liquid comprising cyclohexane and said aromatic hydrocarbon contaminant;
    (g) subjecting said hydrogen gas fraction of Step (f) to methanation under conditions sufficient to convert said carbon oxides to methane and water, thereby producing a purified hydrogen stream containing less than 5 p.p.m. carbon monoxide;

(h) introducing said purified hydrogen stream and a benzene feed stream into a conversion zone under conditions sufficient to convert benzene to cyclohexane; and, (i) recovering cyclohexane from the effluent of said conversion zone.

5. Process according to claim 4 wherein said aromatic hydrocarbon liquid comprises benzene.

6. Process according to claim 5 wherein a portion of the liquid stream of Step (b) is utilized in Step (c) as the liquid, and another portion is utilized in Step (h) as benzene feed.

7. Process according to claim 5 wherein said rich liquid of Step (f) is introduced into the conversion zone of Step (h).

References Cited

UNITED STATES PATENTS

| | | | |
|---|---|---|---|
| 3,361,535 | 1/1968 | Pollitzer et al. | 260—449 |
| 2,074,311 | 3/1937 | Moore | 260—449.6 |
| 2,251,000 | 7/1941 | Pyzel | 260—449.6 |
| 2,755,317 | 7/1956 | Kassel | 260—667 |
| 3,054,833 | 9/1962 | Donaldson et al. | 260—667 |
| 2,487,981 | 11/1949 | Reeud | 23—213 |

DELBERT E. GANTZ, Primary Examiner

V. O'KEEFE, Assistant Examiner

U.S. Cl. X.R.

23—210; 260—672